United States Patent [19]

Shoh et al.

[11] 3,920,504

[45] Nov. 18, 1975

[54] FRICTION WELDING APPARATUS

[75] Inventors: Andrew Shoh, Ridgefield, Conn.; Ernest P. Holze, Jr., Brewster, N.Y.

[73] Assignee: Branson Ultrasonics Corporation, Stamford, Conn.

[22] Filed: Oct. 25, 1974

[21] Appl. No.: 517,970

[52] U.S. Cl. ............... 156/580; 156/73.5; 156/556; 228/2; 321/68
[51] Int. Cl.² .......................................... B23K 19/02
[58] Field of Search .......... 321/68; 228/2; 156/580, 156/556, 73.5; 29/470.3; 425/456; 264/69

[56] References Cited
UNITED STATES PATENTS

| | | | |
|---|---|---|---|
| 3,554,845 | 1/1971 | Billett et al. | 156/580 |
| 3,750,927 | 8/1973 | Miller et al. | 156/73.5 |

Primary Examiner—Edward G. Whitby
Attorney, Agent, or Firm—Ervin B. Steinberg; Philip J. Feig

[57] ABSTRACT

A friction welding apparatus for joining workpieces, preferably those of thermoplastic material, comprises a stationary support and a platform adapted to undergo translating reciprocating motion responsive to the force provided by electromagnetic means coacting between the platform and support. The platform is coupled to the support by a set of leaf spring members constructed for yielding in the direction of the translating motion, but for exhibiting rigidity in the direction perpendicular to the direction of said motion. The leaf spring members together with other means cause the workpieces joined to be in predetermined alignment upon cessation of the motion. The platform is constructed to oscillate near or at its condition of resonance when subjected to the force of the electromagnetic means. Fluid responsive means in combination with pin and cam means provide forced engagement between the workpiece supported by the platform and the workpiece retained by the support.

26 Claims, 11 Drawing Figures

(a) CURRENT THROUGH COIL 30

(b) CURRENT THROUGH COIL 30'

(c) MAGNETIC FORCE PRODUCED BY COIL 30

(d) MAGNETIC FORCE PRODUCED BY COIL 30'

FRICTION WELDING APPARATUS

BRIEF SUMMARY OF THE INVENTION

The present invention refers to friction welding apparatus for joining workpieces, especially those of thermoplastic material. More particularly, this invention concerns an improved friction welding apparatus characterized by simplified construction and the inclusion of means for achieving a predetermined alignment or registration between workpiece portions after completion of the weld.

It is well-known from the prior art that plastic workpieces canbe joined by rubbing the workpieces together until their abutting surfaces soften under the influence of frictional heat and forcibly holding or clamping the workpieces together along the softened surfaces until such surfaces cool and solidify.

The integrity of the weld at a predetermined clamping force and welding time is dependent primarily upon the relative motion between the workpiece portions to be joined. The relative motion is not affected by the fact that only one workpiece portion is in motion while the other workpiece portion is held stationary instead of both workpiece portions being subjected to motion. It is quite evident that the welding apparatus and its fixturing is simplified when one workpiece portion is held stationary.

Aside from joining two workpiece portions, the friction welder in many cases is required to provide workpieces exhibiting a predetermined alignment of the portions joined.

In many prior art devices the workpiece movement is accomplished by spinning one workpiece about an axis relative to the other workpiece and then stopping the spinning movement when the abutting workpiece surfaces have sufficiently softened. While this process has been successful, it has been limited to general applications where there is not requirement of workpiece registration. This situation ocurs where the parts are circular or symmetrical and the relative final positions of the workpieces are noncritical.

A prior art solution for achieving registration requires complex electrical circuits to return a rotating spindle to its original position, see for instance, U.S. Pat. No. 3,750,927 by Robert G. Miller et al., issued Aug. 7, 1973, entitled "Apparatus and Control for Angular Alignment of Inertia or Friction Welded Parts".

U.S. Pat. No. 3,062,695 of Walter E. Hull, issued on June 30, 1959 entitled "Methods of and Means for Securing Together Thermoplastic Members", discloses a method of joining thermoplastic workpieces in predetermined registration. The patent describes a friction welding apparatus adapted to undergo reciprocating rotary motion, the angle of rotation being responsive to the lateral displacement of a pin which acts upon eccentric drive means. As the pin is moved from its starting position, the angle of rotation progressively increases and as the pin is restored to its original position, the reciprocating motion diminishes and ceases. The problems encountered with this prior art construction, typically, include excessive mechanical wear due to friction and high peak accelerating forces effective upon gears, rods, etc. causing misalignment errors, especially when welding large workpieces. Another problem resides in the fact that eccentric motion reduces machine efficiency.

Other methods for registering workpieces during friction welding rely on the sudden cessation of motion when the parts are aligned, such sudden braking of the machine causes excessive wear of the gears and early destruction of the machine resulting from the cyclic application of high amplitude braking forces.

Many of the prior art devices employ nonresonant drive mechanisms. In such instances, the drive mechanism, in addition to supplying the frictional force to perform the welding, must provide sufficient energy to overcome the high accelerating forces of the vibrating workpiece and fixture. The result is increased wear of the drive mechanism and severe limitations upon the size of the workpieces.

The present invention discloses a method of friction welding using alternating electromagnetic force means to provide the reciprocating translating motion between the workpieces. A platform adapted to retain a first workpiece and to undergo reciprocating translating motion responsive to an alternating electromagnetic force is coupled by coupling members to a stationary support retaining a second workpiece to be welded to the first workpiece. The coupling members are designed to position the platform in the absence of an electromagnetic force at an initial rest position. Responsive to the alternating electromagnetic force, the coupling members yield along a first axis in the direction of the applied force, causing the platform to undergo reciprocating translating motion. When the electromagnetic force is terminated, the coupling members restore the platform to its rest position. The coupling members, typically leaf spring means, are of sufficient thickness and rigidity to inhibit motion of the platform along an axis perpendicular to the direction of the translating motion.

The platform is dimensioned to be resonant or nearly resonant in combination with the workpiece at the frequency of the applied alternating electromagnetic force. In addition, the support includes means for applying an engagement force between the two workpieces to be welded in a direction perpendicular to the direction of reciprocating motion.

The invention also includes control means for causing the alternating electromagnetic force to be applied only after a sufficient engagement force exists between the two workpieces to be welded. In this manner, the vibratory motion is initiated after the machine has reached a safe operating position.

Still further, means are provided to reduce the danger of injury to the operator by causing the clamping force between the workpieces to be applied only after there exists insufficient clearance between mating portions of the machine into which the operator might insert a finger.

A principal object of the present invention is, therefore, the provision of an improved and novel friction welding apparatus for joining two plastic workpieces.

Another salient object of the invention is to provide automatic registration of the welded workpieces with respect to each other.

A further important object of the invention is to provide reciprocating motion by an electromagnetic force generating means. A preferred embodiment of the generating means includes a Scott T-connection coil arrangement.

An additional object of this invention is to provide registration of the workpieces joined by employing leaf spring members to couple a platform adapted to undergo reciprocating motion and supporting one workpiece to the stationary frame of the apparatus supporting a second workpiece.

A still further object of this invention is to inhibit actuation of the electromagnetic force generating means until a force of predetermined magnitude exists between the workpieces to be welded.

Other and further objects of this invention will become more clearly apparent from the following description when taken in conjunction with the accompanying drawings.

DETAILED DESCRIPTION OF THE INVENTION

Figure 1:
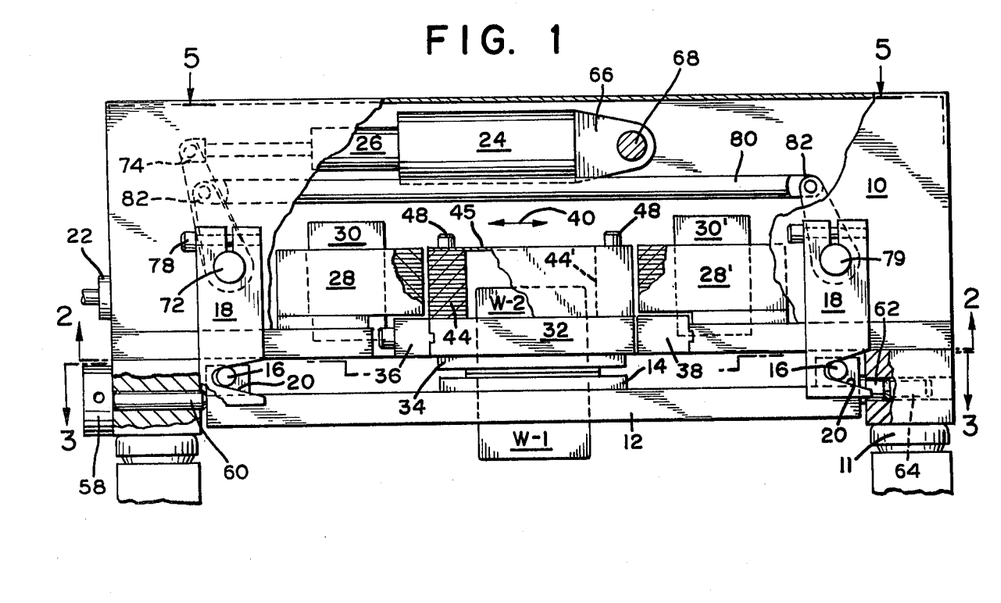
FIG. 1 is an elevational view, partly in section, of a preferred embodiment of the invention.

Referring now to the figures and FIG. 1 in particular, a rectangular boxlike support 10 is provided with a set of legs 11 for resting on a stationary surface, and includes a removable cover plate 12 disposed at the bottom and containing a nesting fixture 14 for holding stationary a first workpiece W1 to be welded. The cover plate 12 is provided with four symmetrically disposed pins 16 adapted to be engaged by respective cam means 18. Each cam means 18, pivotally mounted, is provided with an inclined cam surface 20 for moving along the respective pin 16. When the pins are tightly engaged by the cam means, the plate 12 is drawn upward against the support 10. Each cam surface 20 is dimensioned so that its length exceeds the distance traveled over the pin 16 when the plate 12 is drawn tightly against the support 10.

A fitting 22 disposed on the support 10 is adapted to receive fluid under pressure from an external source (not shown) and is coupled by suitable means, not shown, to the cylinder 24 for causing reciprocating motion of the associated piston 26. The piston 26 is coupled, as will be explained in greater detail hereinafter, by linkage means to the cam means 18 for causing the pins 16 to be disengaged from the cams when the piston is retracted into the cylinder, and to provide, when the piston is extended, as shown in FIG. 1, engagement between the pins 16 and the cam means 18 for effecting the upward clamping force upon the plate 12 as the respective cam surfaces 20 travel relative to the pins 16.

Figure 2:
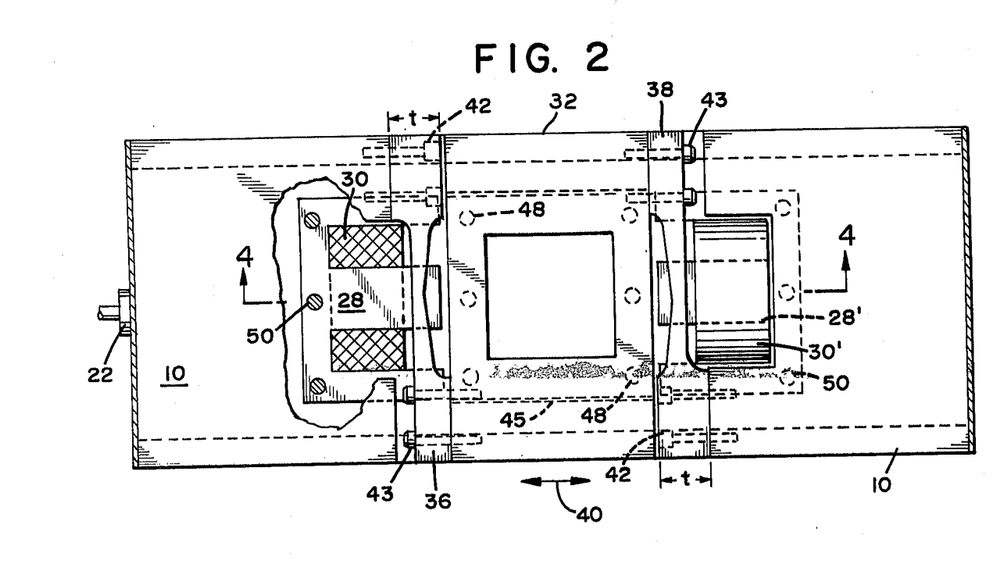
FIG. 2 is a sectional view along line 2—2 in FIG. 1.

The support 10 also contains electromagnetic force generating means comprising a pair of E-shaped laminated transformer cores 28 and 28'. Disposed around the center leg of each core is a coil winding 30 and 30', see FIGS. 2 and 4. The laminations of the transformer core 28 and core 28' are held together and secured to the support 10 by means of resspective bolts 50 as best seen in FIG. 2. The coil windings 30 and 30' are designed and wired for providing a Scott T-connection coil arrangement, see FIG. 10. The scott T-connection arrangement converts three-phase input power to two-phase output power, the two phases are in phase quadrature (that is, out of phase with respect to each other by 90°), see, for instance, Section 7-4 in the book "Static Electromagnetic Devices" by Hunt and Stein, published by Allyn and Bacon, Inc., Boston, 1963.

Coupled to the support 10 is a movable platform 32 containing a nesting fixture 34 adapted for holding a second workpiece W2 which is to be welded to the first workpiece W1. The platform 32 is designed so that when the nesting fixture and workpiece W2 are in place, the platform and its load will be resonant or nearly resonant at the frequency of the electromagnetic force generating means. The platform 32 is coupled to the support 10 by means of yieldable leaf spring members 36 and 38, see FIG. 2. The leaf spring members 36 and 38 are constructed to yield along an axis in the direction of arrow 40, the motional axis, but to exhibit rigidity along an axis perpendicular to the motional axis. The leaf spring members 36 and 38 most suitably, as seen in FIG. 2, are designed so that one end is thicker in the direction of the arrow 40 than the other end and the thickness $t$ of the wide end of the spring member is dimensioned to provide a mechanical stop for the motion of the platform 32 along the motional axis. Typically, the platform is designed to be displaced 0.2 inches (5 mm) peak-to-peak. The wider end of each leaf spring is mounted to the support 10 by means of threaded countersunk bolts 42. The narrower ends of the leaf spring members 36 and 38 are mounted to respective opposite edges of the platform 32 by threaded bolts 43. A pair of magnetic cores 44 and 44' of "I"-shape and laminated construction similar to the cores 28 and 28' are enclosed within a boxlike structure 45 which provides support to the cores 44 and 44'. The cores 44 and 44' are secured to the platform 32 by threaded bolts 48.

The workpieces W1 and W2 are provided with lips which, under the influence of frictional energy, become soft. Upon the cessation of the applied electromagnetic energy, the softened material at the lips of the workpieces fuse to provide one integral workpiece fused along the lip.

Figure 10:
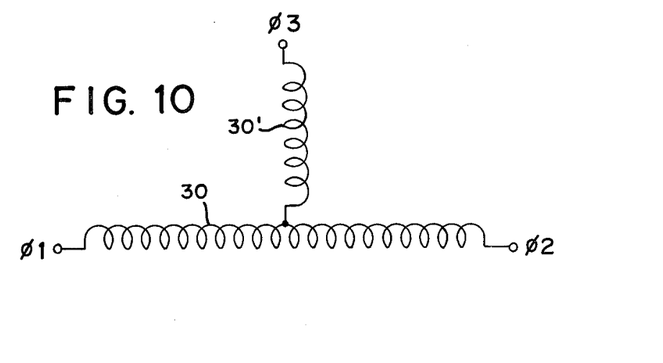
FIG. 10 is a schematic circuit diagram of the electromagnetic coil windings used in the present invention.
Figure 11:
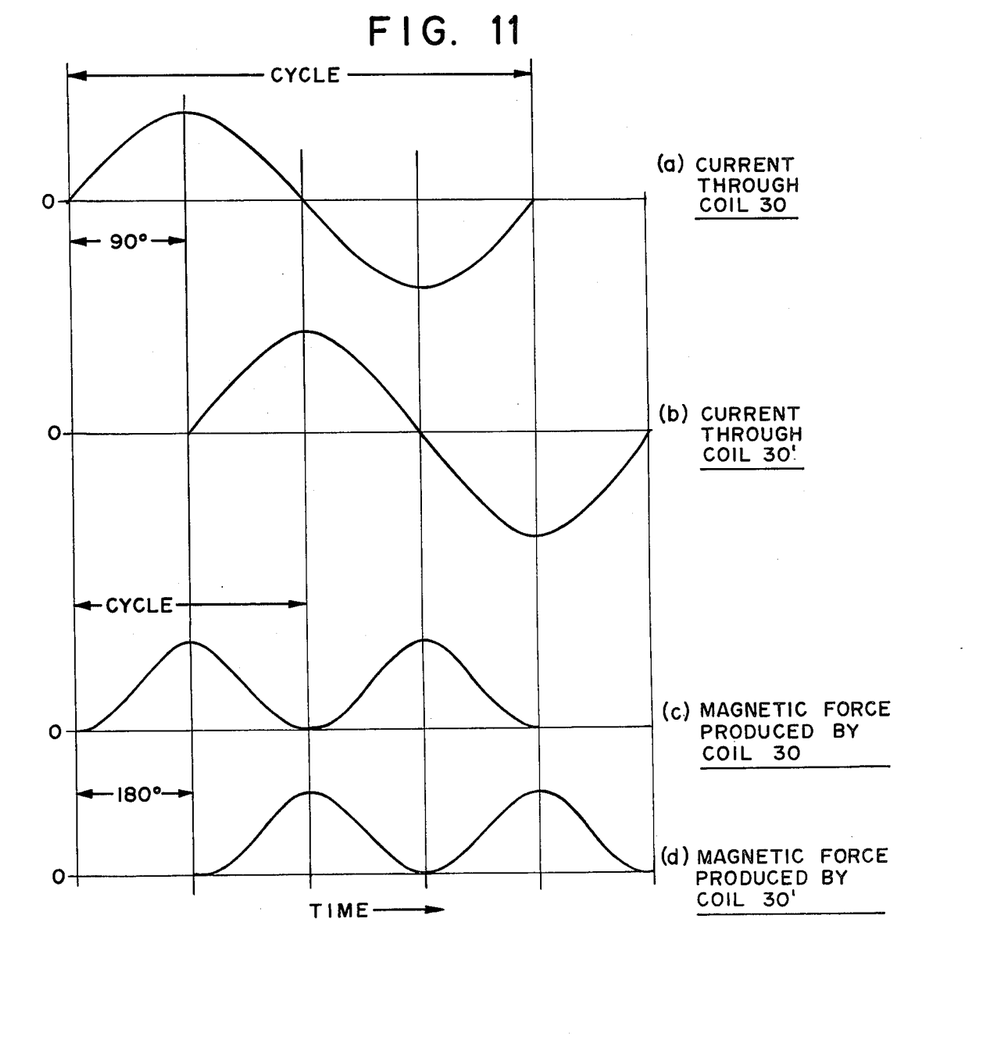
FIG. 11 is a schematic representation of the voltage and electromagnetic force waveforms originating within the coils of FIG. 10.

The coil windings 30 and 30 30' are connected to a three-phase alternating current source of power by conventional means as shown in FIG. 10. Two phases, $\phi 1$ and $\phi 2$, of the input three-phase alternating current power supply are connected across the coil 30. The coil 30' is connected between the third phase $\phi 3$ of the input of the input power supply and the center tap of coil 30 so that two-phase alternating current currents are in time guadrature and the ampere-turns of each coil are of equal amplitude by proper selection of the turns ratio as is known in the art. The present embodiment does not use secondary transformer voltages to provide the driving signal to the coils 30 and 30'. Referring to FIG. 11, trace a depicts the waveform of the current in coil 30 and trace b represents the waveform of the current in coil 30' which is in time guadrature with the current waveform shown as trace $a$. Traces $c$ and $d$ show the magnetic attraction force responsive to the currents as shown by the waveforms of traces $a$ and b. The frequency of the magnetic force is twice that of the impressed voltage, i.e. the line frequency, and the force waveforms of the two coils are out of phase with each other by 180°.

Figure 4:
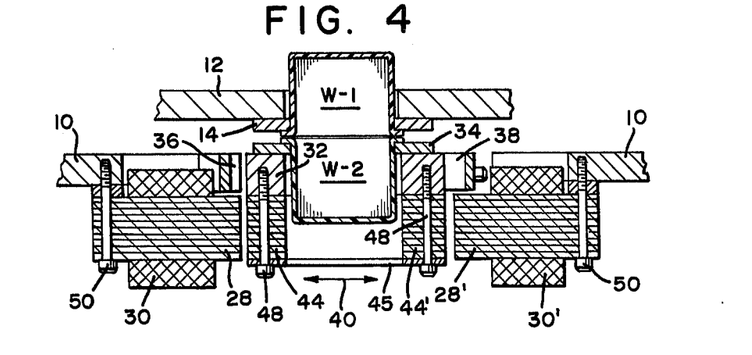
FIG. 4 is a sectional view along line 4—4 in FIG. 2.

Accordingly, each transformer core 28 and 28' is cyclically magnetized for attracting the magnetic cores 44 and 44' attached to the platform, thus causing the platform 32 to undergo oscillating motion along the motional axis shown by arrow 40. It should be understood that instead of the connection shown in FIG. 10, a direct current supply in combination with a switching means can be used to alternatingly energize magnet coils 30 and 30'. The magnetic I-cores 44 and 44' are secured to the platform 32 by bolts 48, as best seen in FIG. 4, and hence the workpiece W2 disposed in nesting fixture 24 coupled to platform 32 will be subjected to reciprocating translating motion along the direction of arrow 40, parallel to the plane of the abutting surface along which workpieces W1 and W2 meet.

The coil arrangement shown in FIG. 10 in conjunction with the mechanical embodiment described hereinabove provides a simple annd improved method of causing frictional reciprocating translating motion between two workpieces W1 and W2.

Figure 5:
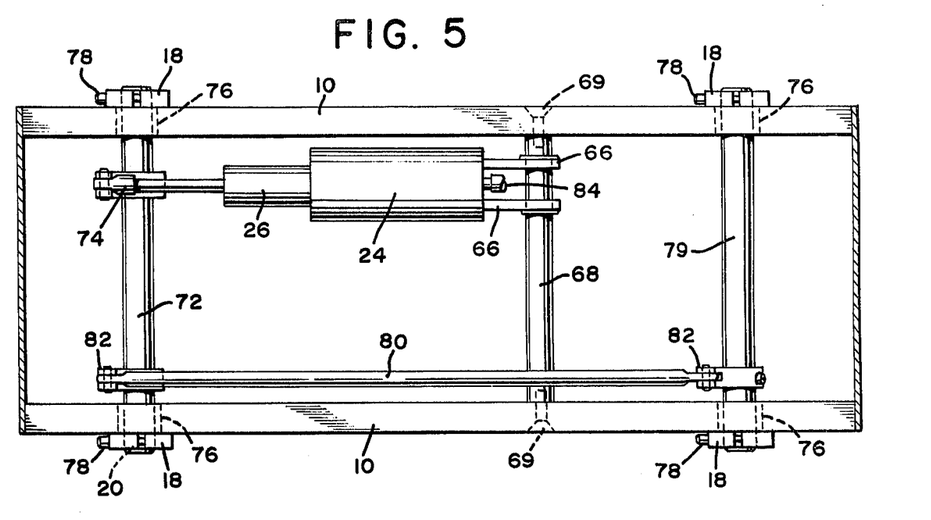
FIG. 5 is a sectional view along line 5—5 in FIG. 1.

In preparation for welding, the plate 12 is lowered for permitting a workpiece W1 to be inserted into the fixture 14. The plate is then lifted toward the platform 32 and the cylinder 24 is pressurized for driving the piston 26 to its extended position, toward the left as seen in FIGS. 1 and 5. This piston motion causes the inclined cam surface 20 to engage the respective pins 16 and to travel along the respective pins 16 for providing the engagement force between the workpieces to be joined.

There are two distinct problems in aligning the workpieces in a friction welder of the type described. The first problem is to assure that the moving workpiece returns to its neutral or initial rest position upon the cessation of the applied electromagnetic force. The second problem is to assure that the stationary workpiece is kept substantially stationary during the welding cycle and also that the stationary workpiece is in its aligned position independent of any tolerance build up or "play" inherent in the manufacture of a friction welder.

In the present invention the first problem is solved by dimensioning the spring members 36 and 38 so that they yield along an axis in the direction of arrow 40, yet are rigid along an axis perependicular to the direction of arrow 40 while at the same time being sufficiently rigidd to return the workpiece to its initial rest position upon the cessation of the reciprocating motion.

Figure 3:
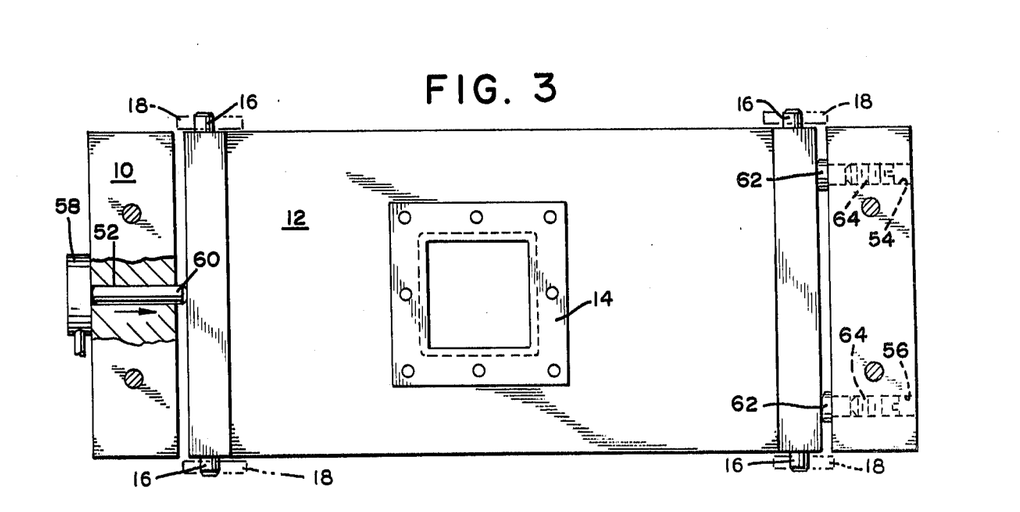
FIG. 3 is a sectional view along line 3—3 in FIG. 1.

The second problem is solved by the mechanism involving a hydraulic pancake cylinder 58, FIG. 3, driving a piston rod 60 slidably moving through a bore 52 in support 10. The piston 60 produces a constant static force on the plate 12 along an axis in the direction of arrow 40 during the weld cycle for assuring that the stationary workpiece W1 will remain stationary along the axis of motion during the welding operation. The piston urges the plate 12 against a set of spacer screws 62 which are used for mechanical adjustment or for compensation the position of the workpiece W1 for play or wear of the machine components. In a preferred embodiment, the spacer screws are made from "Teflon", nylon or brass material. The position of the head of the screw 62 along an axis parallel to the direction of arrow 40 is adjusted by rotating the threaded shanks 64 disposed within the tapped bore holes 54 and 56. By suitably setting the screws, the desire alignment between the workpieces W1 and W2 is obtained for the position when the platform is at its initial rest position. During the welding cycle, the piston 60 is urged into forced contact with the plate 12, causing plate 12 to rest firmly against spacer screw 62. In this manner, while the platform 32 undergoes reciprocating translating motion along an axis in the direction of arrow 40, the plate 12 is maintained indexed along an axis parallel to such motion. Since, as has been stated above, the leaf spring members 36 and 38 are dimensioned to return to their initial rest position when the electromagnetic force is terminated, the workpiece W2 contained within platform 32 also returns to its initial rest position. Therefore, he workpieces are in predetermined alignment relative to each other upon cessation of the electromagnetic force when the softened workpiece lips undergo solidification.

FIG. 5 depicts in greater detail the mechanism by which the workpiece W1 contained within nesting fixture 14 and mounted upon cover plate 12 is urged into forced contact with the workpiece W2 contained within nesting fixture 34 coupled to the movable platform 32. Two mounting arms 66 extending from the cylinder 24 secure the cylinder 24 to a fixed cross rod 68 which is fastened to the support 10 by screws 69. The piston 26 is coupled by means of a clamp 74 to a rotatably mounted cross rod 72 which, in turn, is jouralled in bearing surfaces 76 disposed within the side walls of the support 10. The extending ends of the rods 72 are fitted with respective cams 18 whose slotted ends are clamped upon the rod 72 by screws 78. The cams 18 are aligned to exhibit the same angle of rotation. In this manner, the respective cam surfaces 20 will engage the respective pins 16 simultaneously and advance in a like manner.

A second rotatable cross rod 79 is journalled within similar bearing surfaces 76 disposed in the walls of the support 10. The cams 18 attached to rod 79 are positioned with respect to the cams attached to rod 72 in synchronized angular relation. A connecting rod 80 and clamps 82 disposed at either end of the rod 80 mechanically connect the rods 72 and 79 to one another to cause that the four cam means 18 move in synchronized angular relationship. Therefore, the four cam surfaces 20 simultaneously engage the four pins 16 of plate 12 and cause the force applied on the four corners of the plate 12 in the direction towards the platform 32 to be uniform. This feature provides, responsive to fluid pressure effective upon pistonn 26, an equally distributed force across the workpiece W1 in the plane of the abutting surfaces of the workpieces W1 and W2.

The arrangement described hereinabove exhibits an inherent safety feature. Prior to actuation of the force mechanism, that is the actuation of cylinder 24 and piston 26, the cover plate 12 must be disposed such that the pins 16 can be engaged by the respective cam surface 20. The gap between the nesting fixture 14 and fixture 34 is designed to be less than that which would permit an operator to insert a finger. The present construction, therefore, provides means for precluding injury to the operator's finger during the welding cycle.

Figure 6:
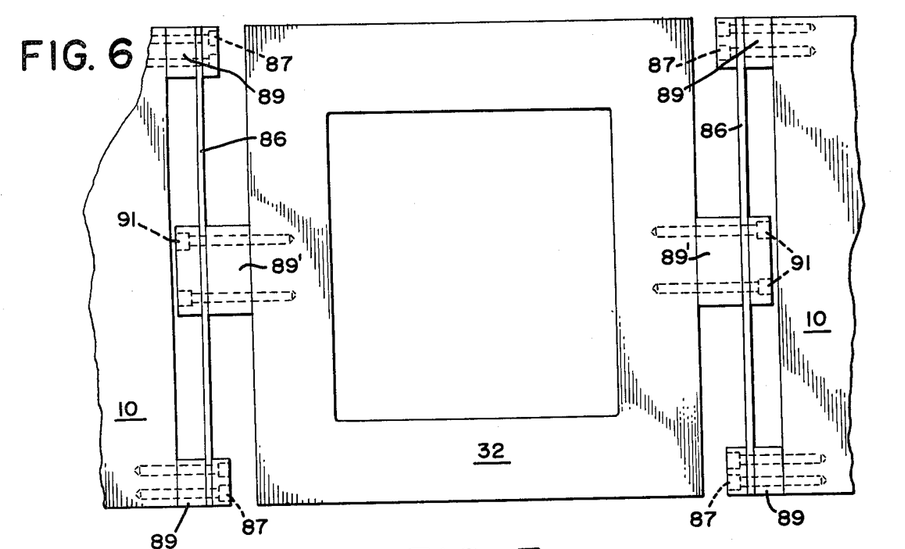
FIG. 6 is a plan view of an alternative embodiment of the invention.

FIG. 6 illustrates an alternative construction of the leaf springs used for coupling the platform 32 to the support 10. This embodiment is particularly useful for wide workpieces requiring a larger platform area. The leaf spring as illustrated comprises a metallic bar 86 of rectangular cross section mounted at each end to the stationary support 10 by means of threaded bolts 87 passing through spacer blocks 89. The center of the bar 86 is secured to the platform 32 by threaded bolts 91 passing through an additional spacing block 89'. There is one such leaf spring arrangement coupling the oppositely disposed sides of the platform 32 to the support 10. Each bar 86 is designed to yield in the direction of the reciprocating translating motion but to exhibit rigidity in a plane perpendicular to the such motion. The thickness of the bolcks 89' is selected to provide a stop for the translating motion of the platform 32.

Figure 7:
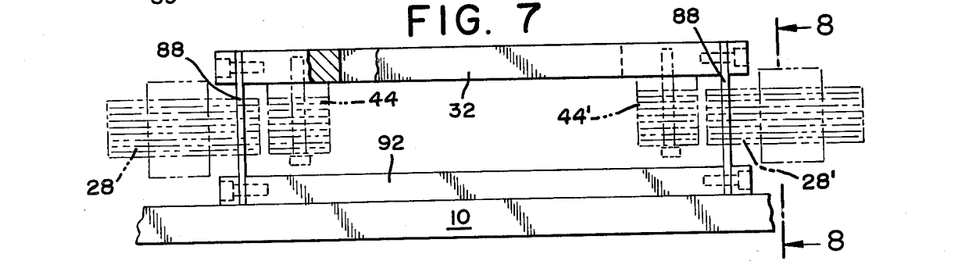
FIG. 7 is an elevational view of a further embodiment of the invention.
Figure 8:
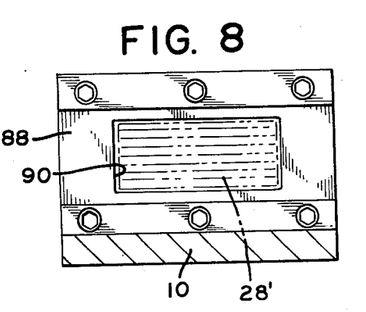
FIG. 8 is a sectional view along 8—8 in FIG. 7.

FIGS. 7 and 8 show a further alternative embodiment for coupling the platform 32 to the support 19. In this embodiment, vertically disposed spring member 88 containing a rectangular aperture 90, dimensioned for allowing the transformer core 28 and 28' to pass therethrough, are securely fastened by means of threaded bolts along the top edge to the platform 32 and along the bottom edge to a support block 92 which is mounted to the base of support 10 by conventional means not shown. When the windings 30 and 30' are excited the platform 32 will be alternately attracted toward the stationary cores 28 and 28' in the manner described above. The spring members 88 are dimensioned to yield in the horizontal direction of motion but to exhibit rigidity in the direction along the vertical plane, see FIGS 7 and 8. The bottom of the spring members are fixedly secured to the support block 92 to provide that upon the cessation of the electromagnetic forces, the platform 32 is returned to its initial rest position ass in the previously described embodiments.

While block 92 is illustrated as a separate component part of the support 10, it is apparent that block 92 can actually be an integral part of the support 10. In alternative embodiments, block 92 comprises two smaller blocks secured to the bottom of support 10, or two bosses machined in the support 10 at the location necessary for securing thereto the lower ends of springs 88.

Figure 9:
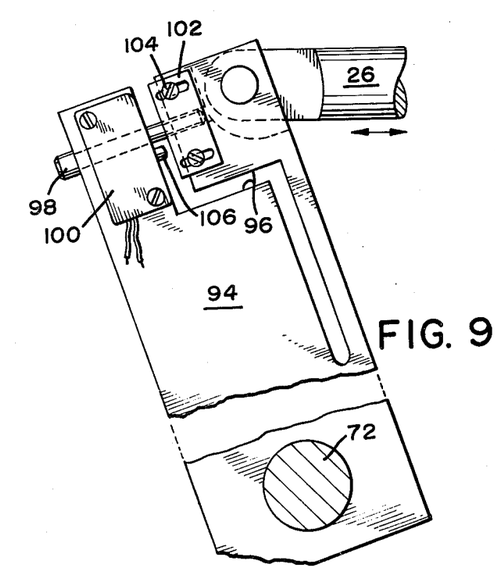
FIG. 9 is a plan view of a preferred embodiment of the control mechanism for activating the electromagnetic force generating system of the invention.

FIG. 9 shows a control machanism for inhibiting the reciprocating translating motion of the platform 32 until a sufficient engagement force between the workpieces W1 and W2 has been established. A bifurcated plate 94 operating as a spring in affixed to cross rod 72, shown clearly in FIG. 5. The piston 26 is coupled to one portion of the bifurcated end of the plate 94. Responsive to the forward motion of the piston 26, the plate 94 will be urged into counterclockwise rotation and such rotation is transmitted by the plate 94 to the cross shaft 72. When the cam surfaces 20 engage the pins 16 a counter force in manifest which force causes the bifurcated ends of plate 94 to approach each other, closing the gap 96 therebetween. On portion of the plate 94, coupled to the piston 26, is fitted with a block 102 mounted by screws 104 extending through slots machined in plate 94. Rigidly mounted on the plate 94 is an electrical switch 100 with an actuation button 106. The button 106 closes electrical contact means within the switch 100 when the bifurcated portions of plate 94 approach each other and block 102 depresses button 106. One side of the contact means is connected to a source of electrical power and the other side of the contact means is connected to the magnet coils 30 and 30'. When the switch is closed electrical power is applied to the coils 30 and 30' and the welding cycle can commence. The location of the block 102 relative to the switch determines the amount of displacement of the block 102 necessary relative to switch 100 for energizing the magnet coils. A threaded bolt 98 is provided to maintain the maximum gap is slot 96 when the piston 26 retracts into the cylinder 24. The slot 96 in plate 94 will not be increased due to the pulling force exerted by piston 26 upon retraction since the bolt 98 passes through the left portion of the bifurcated plate 94 with its head flush against the edge of the plate and threadedly engages the portion of plate 94 which is coupled to piston 26.

The control means shown in FIG. 9 causes the translating motion of the platform to begin only upon the existence of sufficient pressure between the cam means 18 of support 10 and the pins 16 of plate 12, therefore, assuring that the workpieces W1 and W2 are in predetermined forced engagement with each other.

In the preferred embodiment described above, the motion of the platform and the workpiece occurs along an axis in a plane parallel to the mating surfaces of the workpiece. It is apparent that by providing additional electromagnetic generating means and suitably energizing the magnets in timed relation the platform can be made to undergo two-dimensional motion in a plane parallel to the mating surfaces, for instance, circular or elliptical motion.

While there has been described and illustrated a preferred embodiment of a friction welding apparatus and several modifications thereof, it will be apparent that further changes and modifications may be provided without deviating from the broad principle of the present invention which shall be limited only by the scope of the appended claims.

What is claimed is:

1. A friction welding apparatus for joining workpieces comprising:
   a support for holding a first workpiece;
   a platform for holding a second workpiece to be joined to said first workpiece;
   electomagnetic force generating means disposed for causing said platform to undergo reciprocating translating motion relative to said support along a first axis disposed in a plane;
   means coupling said platform to said support comprising yieldable members dimensioned for causing said platform to be in a rest position is the absence of said electromagnetic force and for causing said platform to undergo said reciprocating translating motion responsive to said electromagnetic force while substantially inhibiting motion of said platform along a second axis perpendicular to said plane, and for restoring said platform to said rest position responsive to the cessation of said electromagnetic force, and
   means coupled to said support for providing an engagement force between the respective workpieces on said support and said platform in a direction along said second axis.

2. A friction welding apparatus as set forth in claim 1, said plane being parallel to the surface of said platform.

3. A friction welding apparatus as set forth in claim 1, said workpieces having respective surfaces along which said workpieces are to be joined and said plane being parallel to said surfaces.

4. A friction welding apparatus as set forth in claim 1, said support including a movable plate for holding said first workpiece, and said means providing an engagement force causing said plate to be urged toward said platform and retained substantially stationary along said first axis relative to said platform.

5. A friction welding apparatus as set forth in claim 4, said means providing an engagement force comprising fluid pressure means acting upon movable cam means disposed for engaging pins located on said plate.

6. A friction welding apparatus as set forth in claim 5, said cam means including a cam surface dimensioned to cause the length of said cam surface to exceed the length of said cam surface travel along said pin when the workpieces are in forced engagement.

7. A friction welding apparatus as set forth in claim 1, said platform being dimensioned to be substantially resonant at the frequecy of said electromagnetic force when said second workpiece is disposed in said platform.

8. A friction welding apparatus as set forth in claim 1, said means coupling said platform to said support comprising a pair of spring members coupled to opposite sides of said platform.

9. A friction welding apparatus as set forth in claim 8, said pair of spring members comprising leaf springs, each of said springs being secured with one end to said platform and with the other end to said support.

10. A friction welding apparatus as set forth in claim 8, said pair of spring members comprising a set of leaf springs, each of said springs being secured at each end to said support and secured at its center to said platform.

11. A friction welding apparatus as set forth in claim 8, said pair of spring members comprising a set of leaf springs, each of said springs being secured along one edge to said platform, and along the opposite edge to said support.

12. A friction welding apparatus as set forth in claim 1, and stop menas disposed for providing a stop to limit the displacement of the said platform while undergoing said motion.

13. A friction welding apparatus as set forth in claim 1, said electromagnetic force generating means comprising a pair of electric coils disposed about magnetic cores, and said coils being connected to provide cyclically respective magnetic forces 180 degrees phase shifted with respect to each other.

14. A friction welding apparatus as set forth in claim 13, said magnetic forces being at a frequency which is a multiple of the frequency of the applied signal.

15. A friction welding apparatus as set forth in claim 13, said core being a laminated stack of magnetic material.

16. A friction welding apparatus as set forth in claim 13, said electromagnetic force generating means including means for converting a three-phase alternating current input signal to a two-phase alternating current output signal.

17. A friction welding apparatus as set forth in claim 1, said electromagnetic force generating means comprising magnetic coil means disposed on said support and magnetic core means secured to said platform, and means for causing said coil means to be energized with alternating current.

18. A friction welding apparatus as set forth in claim 1, and including pressure responsive control means coupled to said means for providing said engagement force and connected to said electromagnetic force generating means for inhibiting operation of said electromagnetic force generating means until said engagement force between said workpieces is of predetermined value.

19. A friction welding apparatus as set forth in claim 18, said pressure responsive control means including a mechanical force responsive means and an electrical switch disposed for actuation by said mechanical force responsive means.

20. A friction welding apparatus for joining workpieces along a mating surface comprising:
  a support for holding a first workpiece;
  a platform for holding a second workpiece to be joined to said first workpiece;
  electromagnetic force generating means disposed for causing said platform to undergo reciprocating translating motion relative to said support along a first axis disposed in a plane;
  means coupling said platform to said support comprising yieldable members dimensioned for causing said platform to be in a rest position in the absence of said electomagnetic force and for enabling said platform to undergo said reciprocating translating motion responsive to said electromagnetic force while substantially inhibiting motion of said platform along a second axis perpendicular to said plane, and for restoring said platform to said rest position responsive to the cessation of said electromagnetic force;
  means coupled for moving said support towards said platform along said second axis to cause respective workpieces on said support and said platform to be urged into intimate contact along their mating surfaces, and
  alignment means coupled for positioning said support relative to said platform in the direction of said reciprocating translating motion.

21. A friction welding apparatus as set forth in claim 20, said alignment means comprising a fluid actuated means effective to cause the first workpiece to be adjustably positioned and retained in the direction of said translating motion.

22. A friction welding apparatus as set forth in claim 21, said alignment means including adjustable spacer means.

23. A friction welding apparatus for joining workpieces comprising:
  a support for holding a first workpiece;
  a platform for holding a second workpiece to be joined to said first workpiece;
  electromagnetic force generating means disposed for causing said platform to undergo reciprocating translating motion relative to said support in the first plane;
  means coupling said platform to support comprising yieldable members dimensioned for causing said platform to be in a rest position in the absence of said electromagnetic force and for causing said platform to undergo said reciprocating translating motion responsive to said electromagnetic force while substantially inhibiting motion of said platform in a second plane perpendicular to said first plane, and for restoring said platform to said rest position responsive to the cessation of said electromagnetic force, and
  means coupled to said support for providing an engagement force between the respective workpieces on said support and said platform in a direction substantially perpendicular to said first plane.

24. A friction welding apparatus as set forth in claim 23, and additional means coupled for causing said first workpiece to be biased in indexed position in said first plane.

25. A friction welding apparatus as set forth in claim 23, said support including a movable plate having means for holding said first workpiece, said means coupled for providing said engagement force acting upon said plate for providing said force between said respective workpieces.

26. A friction welding apparatus as set forth in claim 25, said means for providing said engagement force including fluid pressure means in combination with movable cam means and pins disposed respectively on said support and plate, said plate being urged toward said platform responsive to said cam means engaging said pins and moving thereover.

* * * * *

UNITED STATES PATENT OFFICE
CERTIFICATE OF CORRECTION

PATENT NO. : 3,920,504
DATED : November 18, 1975
INVENTOR(S) : ANDREW SHOH ET AL It is certified that error appears in the above-identified patent and that said Letters Patent are hereby corrected as shown below:

Column 4, line 50, delete second occurrence of numeral 30.
Column 4, line 58, delete "guadrature" and insert therefor --quadrature--.
Column 4, line 65, delete "guadrature" and insert therefor --quadrature--.
Column 5, lines 60-61, delete "compensation" and insert therefor --compensating--.
Column 5, line 68, delete "desire" and insert therefor --desired--.
Column 6, line 14, delete "he" and insert therefor --the--.
Column 6, lines 27-28, delete "jouralled" and insert therefor --journalled--.
Column 7, line 10, delete "bolcks" and insert therefor --blocks--.
Column 7, line 13, delete numeral "19" and insert therefor --10--.
Column 7, line 14, delete "member" and insert therefor --members--.
Column 7, line 43, delete "in" and insert therefor --is--.
Column 8, line 1 delete "is" and insert therefor --in--.
Column 8, line 44, delete "is" and insert therefor --in--.
Column 9, line 35, delete "menas" and insert therefor --means--.
Column 10, line 50, delete "the" and insert therefor --a--.
Column 10, line 52, after the word "to" insert --said--.

Signed and Sealed this seventeenth Day of February 1976

[SEAL]

Attest:

RUTH C. MASON
Attesting Officer

C. MARSHALL DANN
Commissioner of Patents and Trademarks